(12) United States Patent
Singh et al.

(10) Patent No.: US 11,615,447 B2
(45) Date of Patent: Mar. 28, 2023

(54) ZERO INVOICING BY REPLICATED STATE

(71) Applicant: Hitachi, Ltd., Tokyo (JP)

(72) Inventors: Prasun Kumar Singh, San Jose, CA (US); Ravigopal Vennelakanti, San Jose, CA (US); Amit Kumar, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/089,944

(22) Filed: Nov. 5, 2020

(65) Prior Publication Data

US 2022/0138815 A1    May 5, 2022

(51) Int. Cl.
*G06Q 30/00* (2012.01)
*G06Q 30/04* (2012.01)
*G06Q 20/38* (2012.01)
*G06Q 20/22* (2012.01)

(52) U.S. Cl.
CPC ........... *G06Q 30/04* (2013.01); *G06Q 20/223* (2013.01); *G06Q 20/3821* (2013.01)

(58) Field of Classification Search
CPC .................................................. G06Q 30/04
USPC ................. 705/40, 1.1, 30, 34, 44
See application file for complete search history.

(56) References Cited

U.S. PATENT DOCUMENTS

| | | | |
|---|---|---|---|
| 8,165,934 B2 * | 4/2012 | Manista | G06Q 40/12 705/30 |
| 2010/0005016 A1 * | 1/2010 | Cooper | G06Q 20/10 705/34 |
| 2020/0211000 A1 * | 7/2020 | Narasimhan | G06Q 20/3678 |

OTHER PUBLICATIONS

ProQuestNPL Search History.*
ProQuestDialogNPL Search History.*

* cited by examiner

*Primary Examiner* — John H. Holly
(74) *Attorney, Agent, or Firm* — Procopio, Cory, Hargreaves & Savitch LLP (57) ABSTRACT

Example implementations are directed to eliminating or reducing the invoicing business process by using replicated states as single truth for sub-groups participating in a supply chain network involving a large number of transient partners in a low trust ecosystem. All activities of the business process such as invoicing are shared as single truth of replicated states for the subgroup. The confidential data involving terms of reference for business process is shared separately as single truth of replicated states among such partners. The validations for business process such as invoicing can be derived by executing smart contracts on such replicated states that have single truth about transactions among different sub-groups/channels in supply chain, thereby reducing/eliminating need for invoice generation that need to be manually verified, validated and acknowledged among supplier and customers for payments.

15 Claims, 8 Drawing Sheets

ZERO INVOICING BY REPLICATED STATE

BACKGROUND

Field

The present disclosure is generally directed to invoicing systems, and more specifically, to facilitating zero invoicing by replicated state.

Related Art

An invoice is a bill or statement issued by a seller (e.g., supplier, service provider) to a buyer (e.g., customer), followed by a sale transaction. It indicates the goods or services, quantities, agreed prices, and payment terms.

In Business to Consumer (B2C) transactions in which the seller sells goods directly to consumers, invoicing is a simple process and consumers often pay at the point of sales. However, in Business to Business (B2B) transactions, invoicing and account payable processes can be complex and time consuming since these transactions often involve multiple departments from both the supplier and the customer. For example, customer orders are received by the sales department of the supplier, goods or services are delivered by the operations team and/or third-party partners, and invoices are issued by the accounting department. Similarly, on the customer side, goods or services are received by the warehouse receiving team, inspections are performed by the quality team or the third-party inspectors, goods or services are consumed by the operations team, and finally the sales invoices are received and processed by the account payable department. In these complex supply chains, the issuance of the invoice by the supplier as well as acceptance of the invoice by the customer often requires multiple rounds of verifications and validations by various teams/departments/partners in the supply chain process. Moreover, in a multi-party supply chain, Information Technology/Enterprise Resource Planning (IT/ERP) systems are often siloed, which leads to a manual and slow reconciliation process for invoices.

SUMMARY

Manual reconciliations would not be required if the verification and validations are conducted by all parties through executing the same set of programs on a common immutable information store. Such automatic reconciliations can be implemented by replicated state techniques.

By using a replicated state, a single truth about the supply chain can be shared among all partners on a common topic established as channel. However, partners in the replicated state on the channels may have low-trust amongst themselves. Thus, sensitive data such as price, contract terms agreed between parties, and so on cannot be shared on a common topic sub-group or channel. Example implementations described herein are directed to addressing such issues while facilitating automatic invoice generation between supplier and customer organizations to reduce order to cash cycles and improve efficiencies.

Aspects of the present disclosure involve a method for a system, which can include providing a plurality of first replicated state databases that are configured to manage transactions; the plurality of first replicated state databases configured to be accessed by a plurality of peer nodes associated with the transactions over a first dedicated channel, the plurality of peer nodes; providing a plurality of second replicated state databases that are configured to manage invoice terms; the plurality of second replicated state databases configured to be accessed by two of the plurality of peer nodes associated with invoicing of the transactions over a second dedicated channel; executing smart contracts across the plurality of peer nodes through the first dedicated channel based on verification of the transactions from the plurality of peer nodes associated with the transactions; and transmitting an invoice flag to a client application of the two of the plurality of peer nodes associated with the transactions based on the verification of the transactions from the plurality of peer nodes associated with the transactions.

Aspects of the present disclosure can further involve a non-transitory computer readable medium, storing instructions for executing a process on a system, the instructions involving providing a plurality of first replicated state databases that are configured to manage transactions; the plurality of first replicated state databases configured to be accessed by a plurality of peer nodes associated with the transactions over a first dedicated channel, the plurality of peer nodes; providing a plurality of second replicated state databases that are configured to manage invoice terms; the plurality of second replicated state databases configured to be accessed by two of the plurality of peer nodes associated with invoicing of the transactions over a second dedicated channel; executing smart contracts across the plurality of peer nodes through the first dedicated channel based on verification of the transactions from the plurality of peer nodes associated with the transactions; and transmitting an invoice flag to a client application of the two of the plurality of peer nodes associated with the transactions based on the verification of the transactions from the plurality of peer nodes associated with the transactions.

Aspects of the present disclosure involve a system, which can include means for providing a plurality of first replicated state databases that are configured to manage transactions; the plurality of first replicated state databases configured to be accessed by a plurality of peer nodes associated with the transactions over a first dedicated channel, the plurality of peer nodes; means for providing a plurality of second replicated state databases that are configured to manage invoice terms; the plurality of second replicated state databases configured to be accessed by two of the plurality of peer nodes associated with invoicing of the transactions over a second dedicated channel; means for executing smart contracts across the plurality of peer nodes through the first dedicated channel based on verification of the transactions from the plurality of peer nodes associated with the transactions; and means for transmitting an invoice flag to a client application of the two of the plurality of peer nodes associated with the transactions based on the verification of the transactions from the plurality of peer nodes associated with the transactions.

Aspects of the present disclosure involve a system, which can include a plurality of first replicated state databases that are configured to manage transactions; the plurality of first replicated state databases configured to be accessed by a plurality of peer nodes associated with the transactions over a first dedicated channel, the plurality of peer nodes; a plurality of second replicated state databases that are configured to manage invoice terms; the plurality of second replicated state databases configured to be accessed by two of the plurality of peer nodes associated with invoicing of the transactions over a second dedicated channel; and a processor, configured to execute smart contracts across the plurality of peer nodes through the first dedicated channel based on verification of the transactions from the plurality of peer nodes associated with the transactions; and transmit an invoice flag to a client application of the two of the plurality of peer nodes associated with the transactions based on the verification of the transactions from the plurality of peer nodes associated with the transactions.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Current supply chains are designed with well-defined workflows among partners. Multiple supply chain partners can interact independently by establishing channels for specific common topics related to workflow activities between them. If there are n partners in the supply chain, then a total of $2^n-n-1$ sub-groups can be created between them, where n=count of organizations in network N. Each message passed among two partners in a subgroup will have minimum of two rounds of verification and confirmation among them. The workflow activities are executed manually using interactions (e.g., phone, e-mails, human interactions) that capture data in individual partner IT systems. Some long-term partners in the supply chain can be integrated point to point by using electronic data interchange (EDI) to facilitate verifications and validations of data internal to partner IT/ERP systems that can be utilized for short order to cash cycles suited for B2C markets. As each of these partner systems are siloed, there is a friction loss leading to huge inefficiencies in the supply chains. In B2B markets, one of the key inefficiencies is the increase in the order to dispatch and invoicing to cash cycles.

Figure 1:
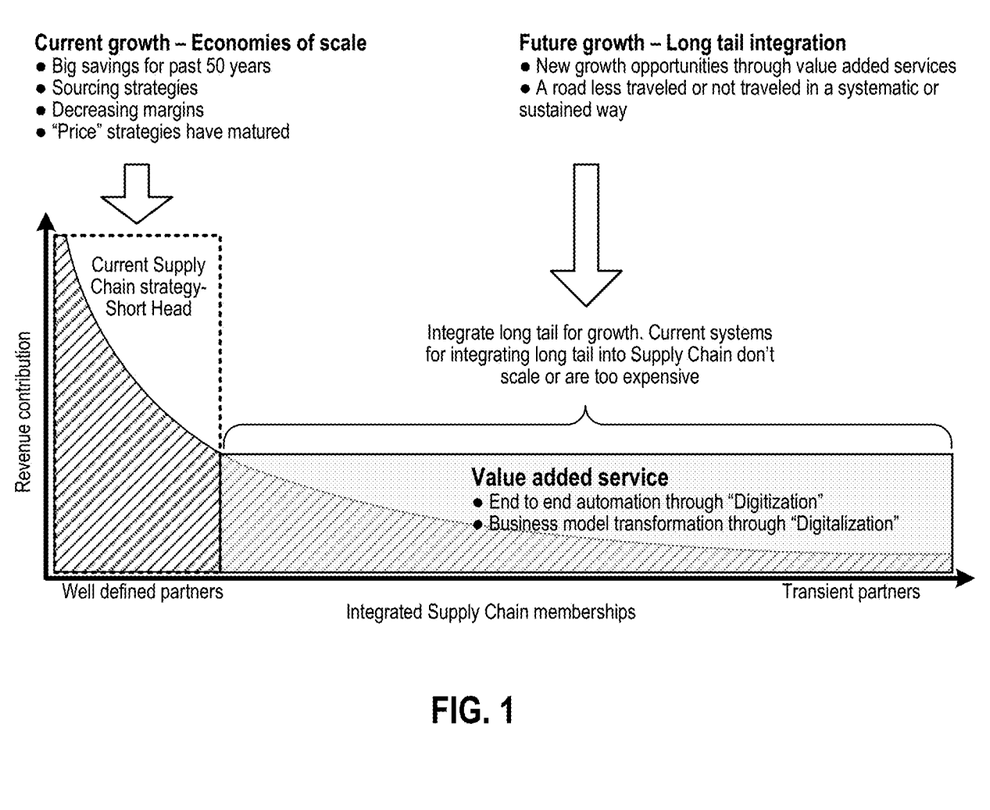
FIG. 1 illustrates a typical business value chain.

FIG. 1 illustrates a typical business value chain. The business value chain includes both a short head of material/product distribution, and a long tail of value-added services such as warehouse management, logistics, inspections, and other product-linked services. The value chain associated with the short head consists of a few well-defined organizations participating for long durations, whereas the value chain associated with the long tail involves a large number of transient service organizations that provide product-linked services often for short duration. Over the past five decades, the manufacturers and distributors have focused on the short head, achieving cost advantage from economies of scale. However, these cost strategies have now matured and provide very slim margin improvements. The value-added services associated with the long tail integration offers a promise towards a double-digit growth in margins; however long-tail integration poses several issues.

One issue is that the transient partners have different levels of IT maturity, from no IT to highly mature IT systems. The cost of integration by using a centralized IT system and EDI can be costly and difficult for such varied levels of IT maturities.

Another issue is that verification, validation and reconciliations have to be done by a supplier by using systems, which can take long cycles of interactions among all partners to the invoicing process.

Further, once the invoice is created and sent by the supplier to the customer organization, there can be further delay in validating the invoice as the customer organization needs to verify, validate and reconcile all transactions among partners for the invoice.

The above issues can be only partially addressed by having a centralized repository as central database (DB) or federated DB. In such a system setup by a dominant partner, smaller partners have to either blindly trust the system or opt out of such centralized systems.

Decentralized systems built using replicated state technology can establish consensus-based trust among all the partners in the supply chain. The need to explicitly generate invoices for payment is not required in such decentralized systems-based supply chain network, as the proof of dispatch and terms of reference for business activities are already executed and agreed upon in the replicated state store.

Example implementations described herein involve three aspects to address the issues in related art invoicing processes by using replicated state techniques for one truth spread across two replicated state ledgers.

In a first aspect, example implementations establish one truth for base activities among partners of the supply chain. An activity replicated state ledger is shared among all partners in the supply chain that participate in the order to cash workflow. Each partner has a current copy of the activity replicated state ledger. The activity transactions among partners are executed as smart contract by each partner peer node and the result is sent to the leader peer nodes for acceptance. Once the transactions are accepted, they are added to the existing activity replicated state, and the peer node has the new replicated state. All partner nodes eventually synchronize to the new activity replicated state as a single truth for the supply chain. In the example implementations described herein, the smart contracts are common procedures, programs, or agents used for the supply chain which can include registering terms of reference for supply chain partners (suppliers, service providers etc.), rules for business operations (quality control metrics, compliance, regulatory etc.), actions (baseline deviation alerts, new supply chain events, exceptions etc.) and other terms in accordance with the desired implementation.

In a second aspect, example implementations store price and other sensitive data among partners as an immutable record in another replicated state called terms of reference replicated state. The price data is verified and endorsed by the partners through a consensus mechanism.

In a third aspect, example implementations generate an automatic invoice when an order is shipped, and shipment is received by customer. The triggering and business rules for invoice are codified in a smart invoicing contract on supplier and customer peer nodes which execute and conduct verification, validation and reconciliation of purchase order (PO), dispatch order (DO) and shipment on activity replicated state data. The relevant pricing information and rules are picked from the terms of reference replicated state shared between the supplier and customer partner peers to generate a smart invoice.

Manual verification, validation and reconciliations are not required for generating invoice as both supplier and customer have participated in the validation and endorsement of the terms of reference for the business transactions.

As illustrated in FIG. 1, the x-axis represents defined partners in a mature supply chain (e.g., automobile industry, transportation industry). On the left side of the x-axis are long-term partners such as manufacturers and distributors, whereas the right side of the x-axis represent transient partners, such as transactional suppliers, service providers, transportation companies, and so on which come and go based on the transaction. Each partner can have their own IT system with varying capabilities (e.g., very little IT capabilities in small companies and moderate to sophisticated IT capabilities in large companies), and yet, the long-term partners need to integrate with transient partners in the longer run to increase the revenues.

In FIG. 1, Y-axis represents revenue contribution from partners. Such revenue contributions can be increased by long tail value chain integration. Example implementations described herein thereby involve an architecture that facilitates a platform between the different types of partners to facilitate such integration and invoicing.

Figure 2:
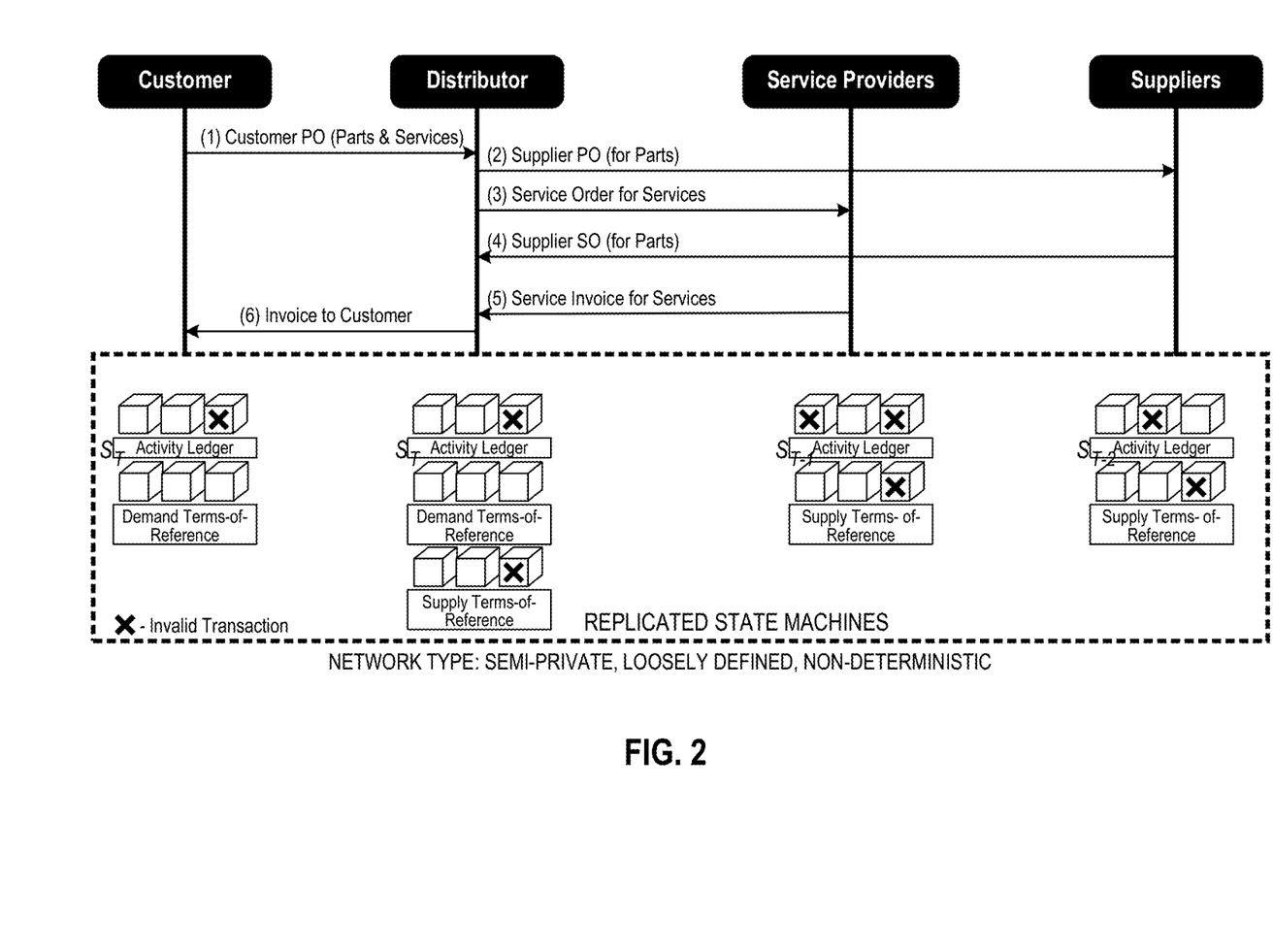
FIG. 2 illustrates example invoicing flow for transient organizations.
Figure 3:
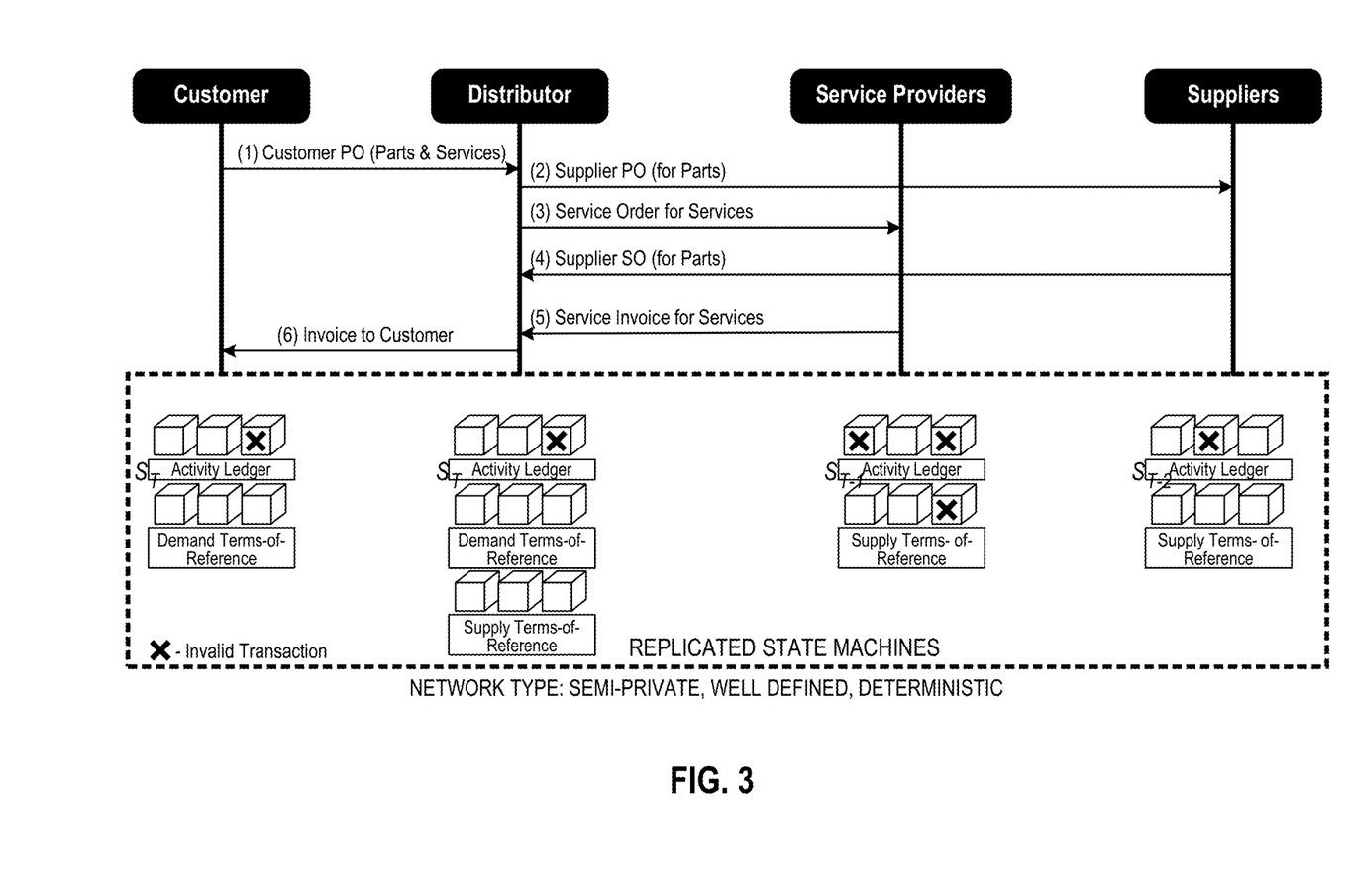
FIG. 3 illustrates an example invoicing flow for well-defined organizations.
Figure 4:
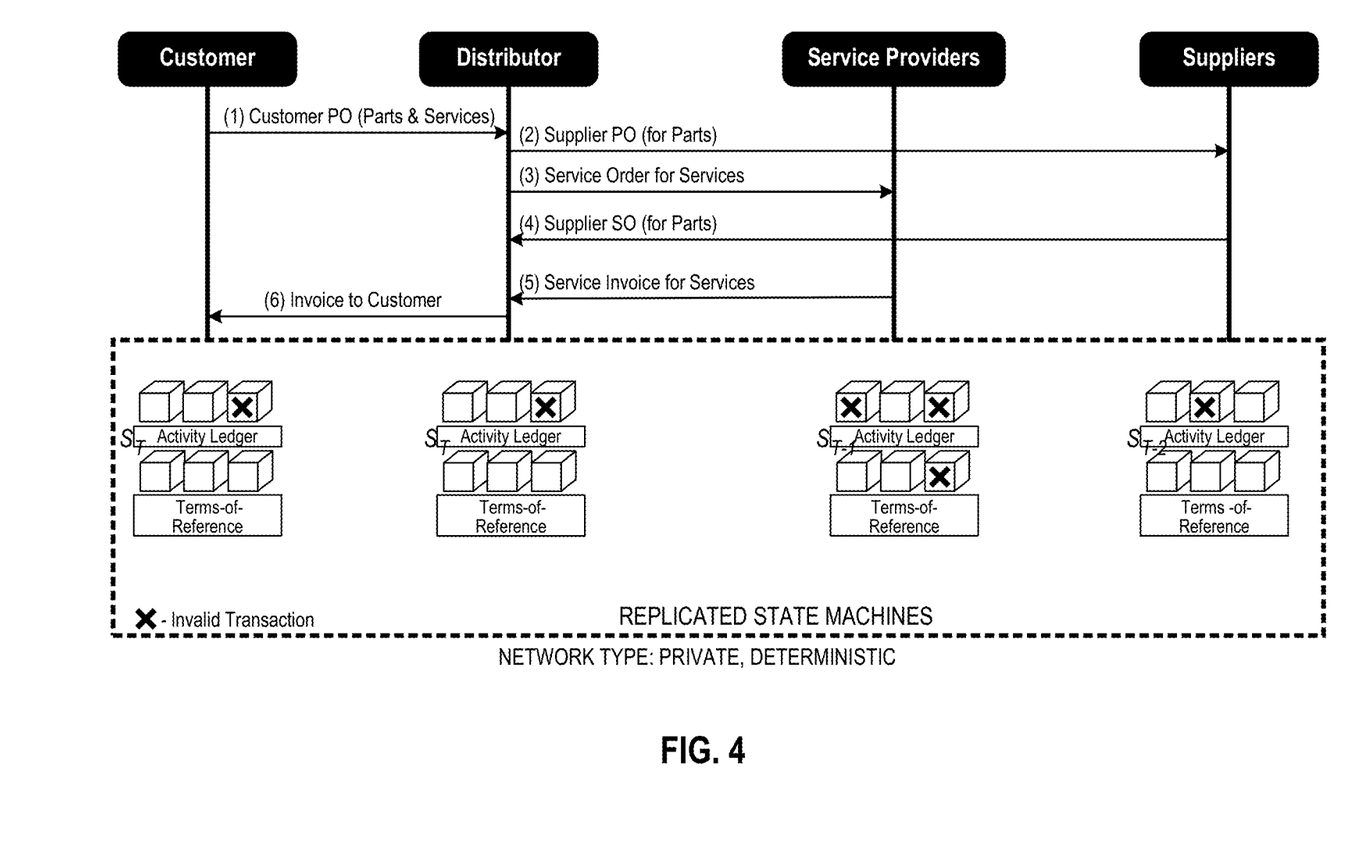
FIG. 4 illustrates an example invoicing flow for permanent intra-organizations.

The invoicing process can thus be accelerated for quick order to cash realization by ensuring trust, privacy and consensus among supply chain partners from the decentralized network using replicated state. FIGS. 2 to 4 illustrate example scenarios for long tail value chain integration from transient to more permanent partners/organizations, in terms of the dispatching and invoicing workflow. As will be illustrated in FIGS. 2 to 4, there can be various types of organizational maturity level, which can include a transient network, well defined partners, and intra-company.

FIG. 2 illustrates example invoicing flow for transient organizations. In the example of FIG. 2 transient organizations are highly transient participants of the ecosystem having a low frequency of transactions intending to interact with each other. These types of participants have low trust shared with other participants of ecosystem. In the example of FIG. 2, there is a transient network made up of the customer, the distributor, and transient organizations such as the service providers and the suppliers. There are channels of communication between these four types of network participants. In the example of FIG. 2 which represents a general supply chain, the customer gives a purchase order for parts and services to the distributor. The distributor issues its own purchase order to the supplier and also to the service providers for the required services. The supplier provides the materials and sends the sales order and invoice to the distributor and the services provider provides the invoice for such services to the distributor. The distributor collects all of the sales orders, invoices from the supplier and service providers and then issues an invoice to the customer.

Because the network is semi-private, loosely defined with various IT maturity levels, the example implementations described herein are directed to providing a platform in which the transient partners such as suppliers and service providers can be integrated into the existing supply chain network to facilitate zero invoicing.

FIG. 3 illustrates an example invoicing flow for well-defined organizations. Well-defined organizations are organizations having a high level of IT maturity for forming a stable and a high volume of transactions. However, they do not trust the IT environments from other well-defined organizations.

In the example of FIG. 3, the network is defined in that the partners have consistent transactions with each other and involve mature IT organizations. An example of such a network can be found in the automobile industry. However, there is a low level of trust between IT organizations, as partners can be suppliers to competing customers within the same sector. Such possibilities remove the incentive for the partners from allowing the sharing of data between partner IT organizations. Such types of network are thereby semi-private in nature, even though it is well defined and it is deterministic because these suppliers and service providers generally have mature IT infrastructures.

FIG. 4 illustrates an example invoicing flow for permanent intra-organizations. Permanent intra-organizations are very well-defined sub-organizations within an organization having high level of IT maturity for forming a stable and high volume of transactions. They trust IT environments from other permanent intra-organizations as being part of same organization.

In the example of FIG. 4, the network can involve an international conglomerate with a number of intra-organizations. Such implementations are like a private network in which only companies that are part of the conglomerate can be on this network. It is more deterministic and as they are part of a broader organization at the global level, so there is more trust between IT entities. FIG. 4 illustrates a third type of supply chain network in which a more permanent intra-organization kind of exchange takes place between them. The network is very well defined within the organization and most organizations have a high level of IT maturity and will trust IT organizations within the group.

Thus, the present disclosure is directed to a zero invoicing algorithm for replicated states through a platform that can be implemented in any of the networks illustrated in FIGS. 2 to 4. Example implementations are directed to the elimination of invoicing by using replicated states (zero invoicing) in a supply chain for long tail integration, involving a large number of transient partners in a low trust ecosystem.

In example implementations described herein, the first aspect involves establishing one single truth for all the activities among the partners. The partners join a network where the replicated state will be shared among partners in a distributed way, wherein each partner is a part of the supply chain and have a business process from order to cash. The order to cash workflow can be as simple as in a B2C, but it can be as complex for very large investment supply chain such as an infrastructure project or manufacture of an aircraft. So, the workflow for order to cash can be very complex.

For establishing a single truth or one truth, each partner has a copy of a replicated state, which is a type of ledger which notes all of the activities among the partners. For activities such as sales, a purchase order is sent to the distributor. Such activities can involve the distributor sending a sales order to the customer. For all the various supply chain activities, the activities are from the transactions which are stored in the replicated state ledger, which can be utilized as an activity ledger. Thus, the transactions created by the partners are executed by a common program as a smart contract which all the partners have access to, and smart contract validates the terms and conditions of each activity in the supply chain. The output of the program, which is run locally by each of the partner nodes, can indicate a success or a failure or it can involve an output that can generate another set of information.

All of the transactions are verified by each partner node, which is executing the common program as a smart contract. All the partners then need to come to an agreement so that the output of the common program on the platform indicates agreement. In example implementations, if only a subset of the partners agree on the smart contract, then the output would indicate so and the program will reject the transaction as the majority does not agree. If the output of the transactions is indicative of being successful, then eventually all the replicated states of the partners will synchronize with this latest transaction. Eventually, all replicated states will have the same data. Thus, a single truth can be inherently applied to the supply chain.

Figure 6:
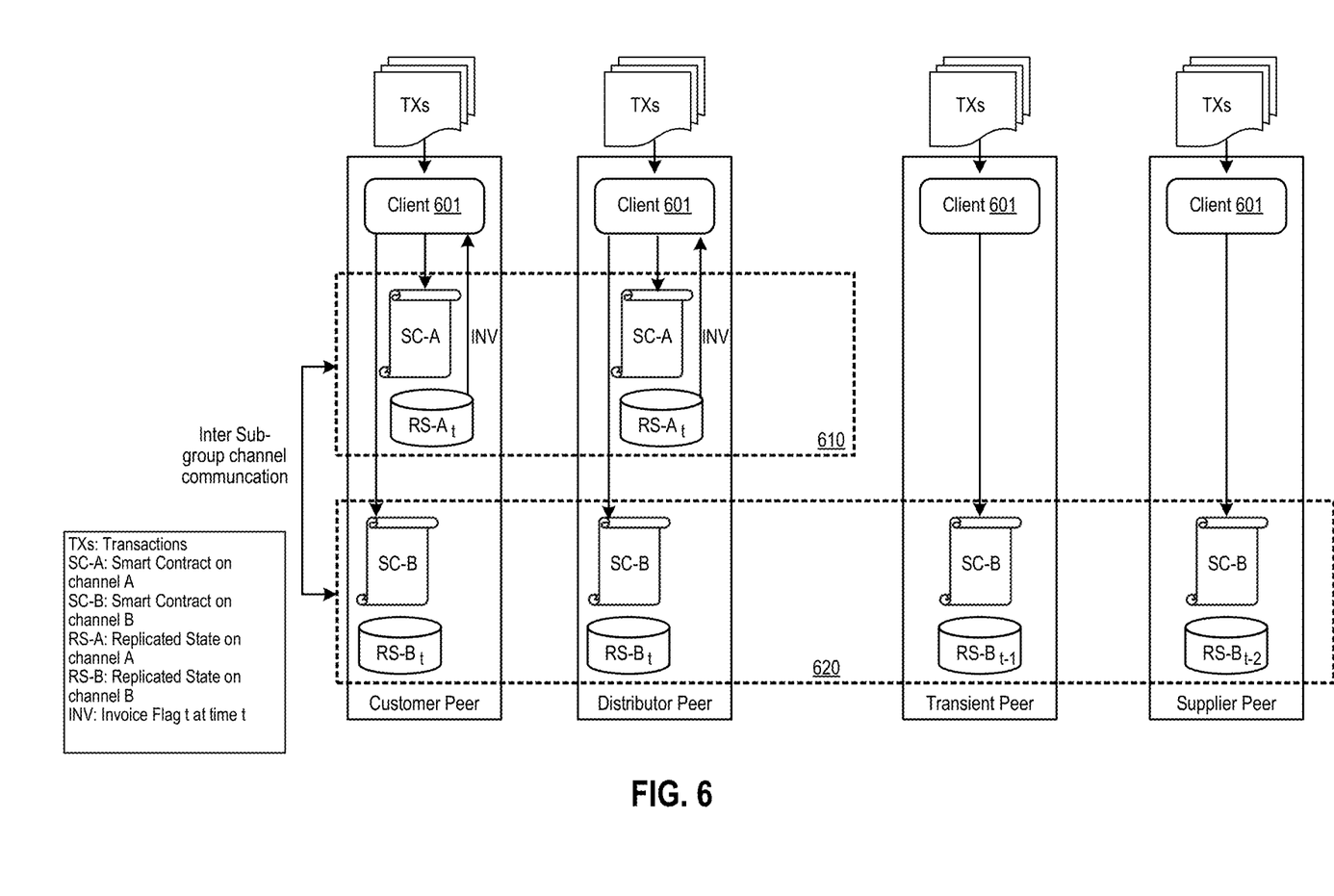
FIG. 6 illustrates the system architecture, in accordance with an example implementation.

The second part is the challenge that partners inside the supply chain can also be competitors for a different set of customers. This prevents partners from sharing sensitive data, such as the pricing information or invoicing terms of the invoice. Each partner does not desire to share the prices used to every other partner in the supply chain. Invoicing terms therefore cannot be placed on the activity replicated state. In example implementations, confidential data can be stored into another replicated state with a dedicated channel of communication for associated parties to share such data among themselves. Such sensitive data is referred to herein as terms of reference for the invoicing activity. So the price data which needs to be verified by the parties who are privileged to that information is verified within the dedicated channel, and if it is valid, then it is confirmed in another replicated state referred to as the terms of reference replicated state. As will be illustrated in FIG. 6, there are two different replicated state ledgers. In a first replicated state ledger, it holds the shared activity data, and the second replicated state ledger holds the price or the terms of reference data. The second replicated state ledger will not only store the confidential information like price, but could also store the terms of the contract and terms of the payment and when invoice should be delivered. In the platform of FIG. 6, an invoicing signal can be provided to indicate when automatic invoicing needs to take place, and the transaction can be completed without revealing invoicing terms to the unnecessary parties.

The third aspect involves generating automatic invoice when an order is shipped or a shipment is received by customer. So, the invoice creation is based upon business rules, which is set in a smart invoicing contract on the supplier and customer node, which are part of the network. All the transactions which form a part of the invoicing activities will be validated by the smart contract which has already done the verification, validation and reconciliation of the activities prior to invoicing (e.g., the purchase order was created, the dispatch order was created, the shipment of goods was sent). All the activities following a part of the business process or the part of the business activities on the supply chain are logged into the two replicated state ledgers and the program will actually, based upon the execution of the rules, generate a flag for the invoice.

To generate the automated invoice, the validated activities are obtained and as well as the pricing information and the rules. For the first part, the validation of the activities is conducted in a first dedicated channel and the relevant pricing and rules for the invoicing are obtained through the second dedicated channel, which is part of the terms of reference replicated state. By using the two replicated states and associated programs as smart contracts, an automatic invoice is generated. In example implementations, the replicated state ledgers can be implemented through any database technique known to one of ordinary skill in the art, such as blockchain.

Figure 5:
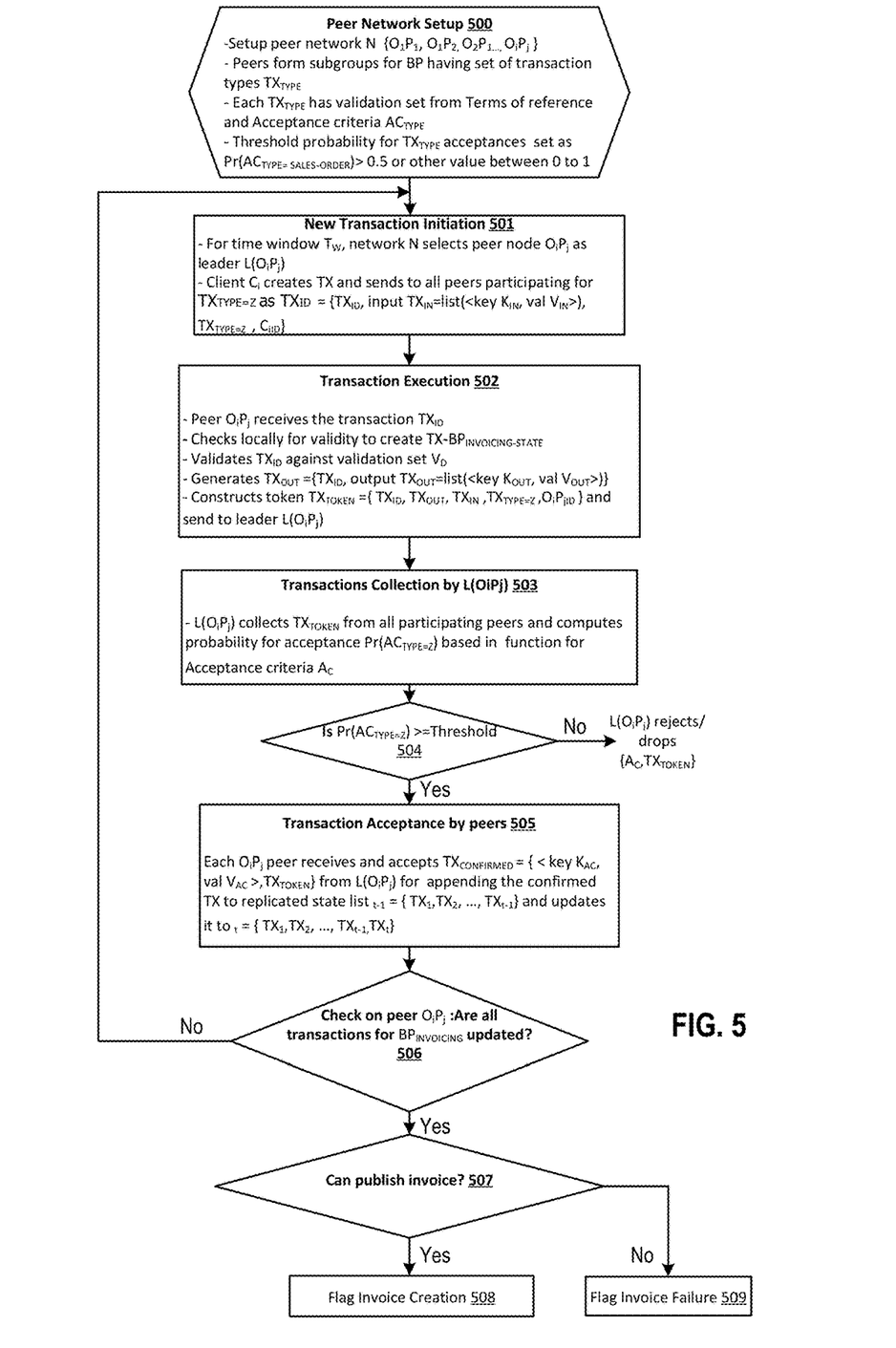
FIG. 5 illustrates an example of a flow diagram for an algorithm for zero invoicing using replicated state, in accordance with an example implementation.

In the present disclosure, the following definitions are set forth and referenced for clarity:

$O_i$—Partner/organizations i in supply chain network N $O_iP_j$—Peer node j of organization i in supply chain network N $L(O_iP_j)$—Peer node $O_iP_j$ selected as Leader node for aggregating $TX_{TOKEN}$ and executing $AC_{TYPE}$ for transaction commit by other peer nodes $\Sigma\phi_t$—Replicated State for Activity subgroup transactions at time t $\Sigma\Psi_t$—Replicated State for Terms-of-Reference subgroup transactions at time t $T_W$—Time window $T_W$ for new transaction acceptance criteria $TX_{TYPE}$—Transaction type in business process BP set $V_D$—Validation set for $TX_{TYPE}$ $TX_{TOKEN}$—Token for Transaction created by Peer $O_iP_j$ by execution of Validation set $V_D$ $TX_{CONFIRMED}$—Transaction confirmed for commit by $L(O_iP_j)$ on accepting result of acceptance criteria $AC_{TYPE}$ and send to all peers for Replicated State update $Pr(AC_{TYPE=SALES-ORDER})$—Probability of acceptance criteria $AC_{TYPE}$ calculated by leader peer for $TX_{CONFIRMED}$, based on probability function $BP_{INVOICING}$—Set of transaction types for Invoicing Business Process $TX\text{-}BP_{INVOICING-STATE}$—Transaction type created by each peer $O_iP_j$ when checking the success/failure condition for the complete set of transactions for $BP_{INVOICING}$ in local Replicated State and flag invoicing state—success/failure FIG. 5 illustrates an example of a flow diagram for an algorithm for zero invoicing using replicated state, in accordance with an example implementation.

At 500, the flow first executes a peer network setup. Each IT infrastructure which participates in that network is referred to as a peer node, which is different from a centralized IT infrastructure in which one node could be a client node and other node could be a server node. The peer network setup facilitates the decentralized replicated state. Let N be a peer network such that $N \in \{O_1P_1, O_1P_2, O_2P_1 \ldots, O_iP_j\}$ where i=organization index and j=peer node index.

Each peer $O_iP_j$ have the following properties as <key K, val V> pair: Peer identifier (ID), Peer Organization ID, Version, last replicated state as Transaction list as replicated state as set of all transaction states $\Sigma\phi_t=\{TX_1, TX_2, \ldots, TX_k\}$ at time T=k where k is initial time, and last transaction ID i.e. $TX_{ID}$)

Each peer $O_iP_j$ forms network N having following properties: N cannot be null (i.e. $N \neq \phi$), N has at least two organizations with one peer each (i.e., min $\{O_1, O_2 \ldots$ $O_i$}>=2, min {$P_1, P_2 \ldots P_j$}>=1), Organizations can participate in a total of $2^n-n-1$ sub-groups in multiple organizations where n=count of organizations in network N i.e. n=|{$O_1, O_2 \ldots O_i$}|

Sub-groups are formed to carry out business processes (e.g. invoicing) having a set of transaction types $TX_{TYPE}$ for the business process as $BP_{INVOICING}=${$TX_{TYPE=SALES-ORDER}$, $TX_{TYPE=DISPATCH}$, $TX_{TYPE=RECEIVED}$, $TX-BP_{INVOICING-STATE}$} whose transaction validations form Terms-of-Reference for BP.

The BP transaction type set has special transaction type $TX-BP_{INVOICING-STATE}$ that is created by each peer $O_iP_j$ when checking the success/failure condition for the complete business process set $BP_{INVOICING}$. For example, $TX-BP_{INVOICING-STATE}=${<$BP_{INVOICING-ID}$, Value>, <$BP_{INVOICING-STATE}$, FAILED>} when there is time out (for avoiding infinite loop) and $TX-BP_{INVOICING-STATE}=${<$BP_{INVOICING-ID}$, Value>, <$BP_{INVOICING-STATE}$, SUCCESS>} when all transaction list in $BP_{INVOICING}$ are committed.

Each transaction type $TX_{TYPE}$ has validation set $V_D$ as <key K, val V> pairs for transaction type $TX_{TYPE}$. For example, for $TX_{TYPE=SALES-ORDER}$: a) $TX_{TYPE=SALES-ORDER}$ the validation set $V_{D=SALES\_ORDER}=${<key-1=valtype-1>, <key-2=valtype-2>, . . . , <key-n=valtype-n>}, wherein valtype can be a fixed value or a user defined value from another smart contract, analytics function, or so on, b) each transaction type $TX_{TYPE}$ has an acceptance criteria $AC_{TYPE}$=<key $K_{AC}$, val $V_{AC}$>, $AC_{TYPE=SALES-ORDER}=${<key-1=valtype-1>, <key-2=valtype-2>, . . . , <key-n=valtype-n>}, wherein valtype can be a fixed value or a user defined value from another smart contract, analytics function, and so on, and c) Threshold Pr($AC_{TYPE=SALES-ORDER}$)>0.5.

For confidential data such as pricing, delivery terms between BP partners, and so on, a separate subgroup can be established having replicated state $\Sigma\Psi_t=${$TX_1, TX_2, \ldots, TX_k$} at time T=k for Terms-of-Reference from where the rules for validations of transactions can be picked.

Depending on the desired implementation, one organization can have multiple nodes in the network and many times these multiple nodes are there for redundancy or for having a local data copy. Such peers can form subgroups inside this network for the business process. In the peer network setup, the supply chain will have a set of transaction types. So, each transaction in the business process, which is a part of the supply chain, will have various transaction types. As an example, one transaction type can involve sales order; a second type can be a purchase order; a third can be like a dispatch order, and so on. Each transaction can have its own set of validation, rules for validation, conditions for validation and the acceptance criteria. This can be a pre-defined during setup or it could be changed even after the network is set up and some new transaction types are introduced, or as some changes in the transaction types are required. All such aspects take place in the peer network setup. Thus, the peer forms subgroups for the business process transaction. Each transaction type has a validation set from the terms of reference and acceptance criteria. Acceptance criteria is the criteria which partners agree to either accept the transaction or to reject the transaction.

During setup, the partners in the transaction will agree on the threshold probability for transaction acceptance set as probability distribution function (e.g., greater than 50% of peer nodes have executed and accepted the transaction is the threshold to accept the transaction as valid).

At 501, a new transaction initiation is conducted. For time window $T_W$, network N selects peer $O_iP_j$ as leader L($O_iP_j$) based on the leader selection rule for the supply chain (e.g. Risk Score, Proof of Stake, Proof of Authority). Then, the supply chain client $C_i\in${transaction initiator clients C for $BP_{INVOICING}$ of organization $O_i$) creates transaction and sends to all peers participating for $TX_{TYPE=Z}$ in business process $BP_{INVOICING}$ as $TX_{ID}=${$TX_{ID}$, input $TX_{IN}$=list (<key $K_{IN}$, val $V_{IN}$>), $TX_{TYPE=Z}$, $C_{iID}$}.

As indicated in 501, once the peer network is set up, then the transaction can be initiated. In an example involving a sales order, if a customer has given a purchase order to a distributor for the list of services and the list of material, and distributor agrees to fulfil purchase order then distributor issues a sales order. As part of dispatch transaction, distributor supplies materials to the customers and services are performed by the service providers. The invoice is generated after customer has received materials and services as part of dispatch workflow. The time window is the window in which the new transaction needs to complete the transaction execution, the sending of transaction to leader node and the transaction acceptance.

When the transaction is submitted by the client, it is sent to all the peers for that particular transaction type. The client program is configured as to which peer nodes are part of the transaction based upon the business process and will facilitate communication to the peer nodes of the partners. As a part of the transaction, it will send the transaction identifier (ID), the input value list of the fields, values, and the transaction type. Depending on the desired implementation, the client can also send the identity from which client has created this new transaction, where it was initiated.

At 502, the transaction is executed. For time window $T_W$, participating peer $O_iP_j$ receives from client the transaction $TX_{ID}$ of transaction type $TX_{TYPE=Z}$. To execute the transaction, the flow checks locally for validity to create TX-$BP_{INVOICING-STATE}$ as described in network setup 500. The flow validates $TX_{ID}$ against validation set $V_{D=TX-ID}=${<key-1=valtype-1>, <key-2=valtype-2>, . . . , <key-n=valtype-n>}. Valtype can be a fixed value or a user defined value from another smart contract, analytics function, and so on, for transaction type $TX_{TYPE=Z}$. The peer executed generates $TX_{OUT}=${$TX_{ID}$, output $TX_{OUT}$=list(<key $K_{OUT}$, val $V_{OUT}$>)} from $V_{D=TX-ID}$. Then, the peer $O_iP_j$ constructs token $TX_{TOKEN}=${$TX_{ID}$, $TX_{OUT}$, $TX_{IN}$, $TX_{TYPE=Z}$, $O_iP_{jID}$} and sends to leader L($O_iP_j$).

Each peer which receives the transaction, $TX_{ID}$, will check locally for validity for that particular business process invoicing state by running the program locally. Each peer will validate that transaction ID against validation set from replicated state. So each peer will execute the program against the set of inputs and the validation rules and generate a transaction out message. The transaction out will have the transaction ID, the output of the transaction as a list of, again, key and value pairs and from that transaction out, a token is constructed as to include transaction out, transaction ID, the transaction input and any additional information as needed. The token is constructed to send the message of the token to the leader node which was a part of the new transaction initiation.

At 503, the flow conducts a transaction collection by L($O_iP_j$). In this flow, the L($O_iP_j$) collects $TX_{TOKEN}$ from all participating peers in time window $T_W$ and computes probability for acceptance i.e. Pr($AC_{TYPE=Z}$)=Function (all acceptances from peers based upon Acceptance criteria $AC_{TYPE=Z}$ for $TX_{TYPE=Z}$). Function can be value between 0 and 1 (e.g. (count of matching {$TX_{OUT}$, $TX_{IN}$}/Total number of $TX_{TOKEN}$)) OR a Softmax Function. Each peer will execute the transaction locally on the local replicated state ledger and then send the token to the leader node. The leader node will wait for the time window and collect all of the transaction tokens from the participating peer to compute the probability for acceptance based on the function for acceptance criteria, which is a part of initial setup for this particular set of business process.

At 504, a determination is made as to whether the probability for acceptance exceeds a threshold so that there can be a transaction acceptance by leader $L(O_iP_j)$. If so (Yes), then the $L(O_iP_j)$ accepts the transaction confirmation and sends the transaction confirmation flow $TX_{CONFIRMED}=\{<key\ K_{AC}, val\ V_{AC}>, TX_{TOKEN}\}$ to all $O_iP_j$ in sub-group for BP in $T_W$, and then proceeds to 505. Otherwise (No), the $L(O_iP_j)$ rejects/drops $\{A_C, TX_{TOKEN}\}$.

At 505, the flow conducts the transaction acceptance by each peer in the BP sub-group at time t in time window $T_W$. Each $O_iP_j$ peer receives and accepts $TX_{CONFIRMED}=\{<key\ K_{AC}, val\ V_{AC}>, TX_{TOKEN}\}$ from $L(O_iP_j)$ for appending the confirmed TX to replicated state list $\Sigma\phi_{t-1}=\{TX_1, TX_2, \ldots, TX_{t-1}\}$ and updates it to $\Sigma\phi_t=\{TX_1, TX_2, \ldots, TX_{t-1}, TX_t\}$.

At 506, a determination is made to repeat the new transaction cycle. That is, a determination is made as to whether if on the local peer, all transactions list of $BP_{INVOICING}=\{TX_{TYPE=SALES-ORDER}, TX_{TYPE=DISPATCH}, TX_{TYPE=RECEIVED}, TX\text{-}BP_{INVOICING-STATE}\}$ are not committed. If they are not all committed (No) then the flow proceeds back to 501, otherwise (Yes) the flow proceeds to 507.

At 507, the peer $O_iP_j$ publishes Invoice State for $BP_{INVOICING}$. The flow determines if the local $\Sigma\phi_t$ for $BP_{INVOICING}$ has $TX\text{-}BP_{INVOICING-STATE}=\{<BP_{INVOICING-ID}, Value>, <BP_{INVOICING-STATE}, SUCCESS>\}$. If so (Yes), then the flow proceeds to 508 to set a flag (Invoice creation), otherwise the $BP_{INVOICING}$ has $TX\text{-}BP_{INVOICING-STATE}=\{<BP_{INVOICING-ID}, Value>, <BP_{INVOICING-STATE}, FAILURE>\}$ and the flow proceeds to 509 to set a flag (Invoice creation failure). The invoice creation failure conditions can involve $BP_{INVOICING}$ transactions $TX_{TYPE}$ failed validation, $L(O_iP_j)$ time out, or so on, in accordance with the desired implementation.

FIG. 6 illustrates the system architecture, in accordance with an example implementation. In the example implementation of FIG. 6, the client 601 is implemented in an application accessible to each of the supply chain partners. The programs are configured to execute smart contracts (SC-A, SC-B).

In the architecture of FIG. 6, the terms-of-reference sub-group channel 610 is configured to manage the replicated state (RS-A$_t$) for the customer peer node and the distributor peer node.

As illustrated in the architecture of FIG. 6, there are two dedicated channels facilitated across sub-groups; a Terms-of-Reference Sub-group channel 610, and a Dispatch Activity Sub-group channel 620. The terms-of-reference sub-group channel 610 manages the invoice terms across the customer peer nodes in the customer subgroup and the distributor peer nodes across the distributor subgroup. Across the customer subgroup and the distributor subgroup can be a first replicated state ledger and smart contracts programs executed for validating transactions submitted by client to the corresponding customer peer node and the distributor peer node, for invoice terms between the customer peer node and the distributor peer node. In the example implementations described herein, the replicated state ledger can be portion or an entire replicated state database.

The Dispatch Activity Sub-group channel 620 manages transactions across the customer subgroup, the distributor subgroup, the transient subgroup and the supplier subgroup through a second replicated state ledger. The second replicated state ledger is used to commit/manage transactions between the customer peer node, distributor peer node, transient peer node, and the supplier peer node that are associated with the transactions.

Each peer node in the customer subgroup, distributor subgroup, transient subgroup, and supplier subgroup have client applications 601 that can be utilized for submitting transactions as illustrated in FIG. 6.

In an example implementation of the architecture, a customer node and distributor node executes smart contract to validate transactions and eventually automatically generate invoice.

The example implementations described herein can be applicable to all supply chain systems requiring reduction in turnaround time in workflow activity for verification and validations using replicated states for single truth, and automation of activities in supply chain using common programs executed on replicated states on secure channels for inter-organization operations.

Figure 7:
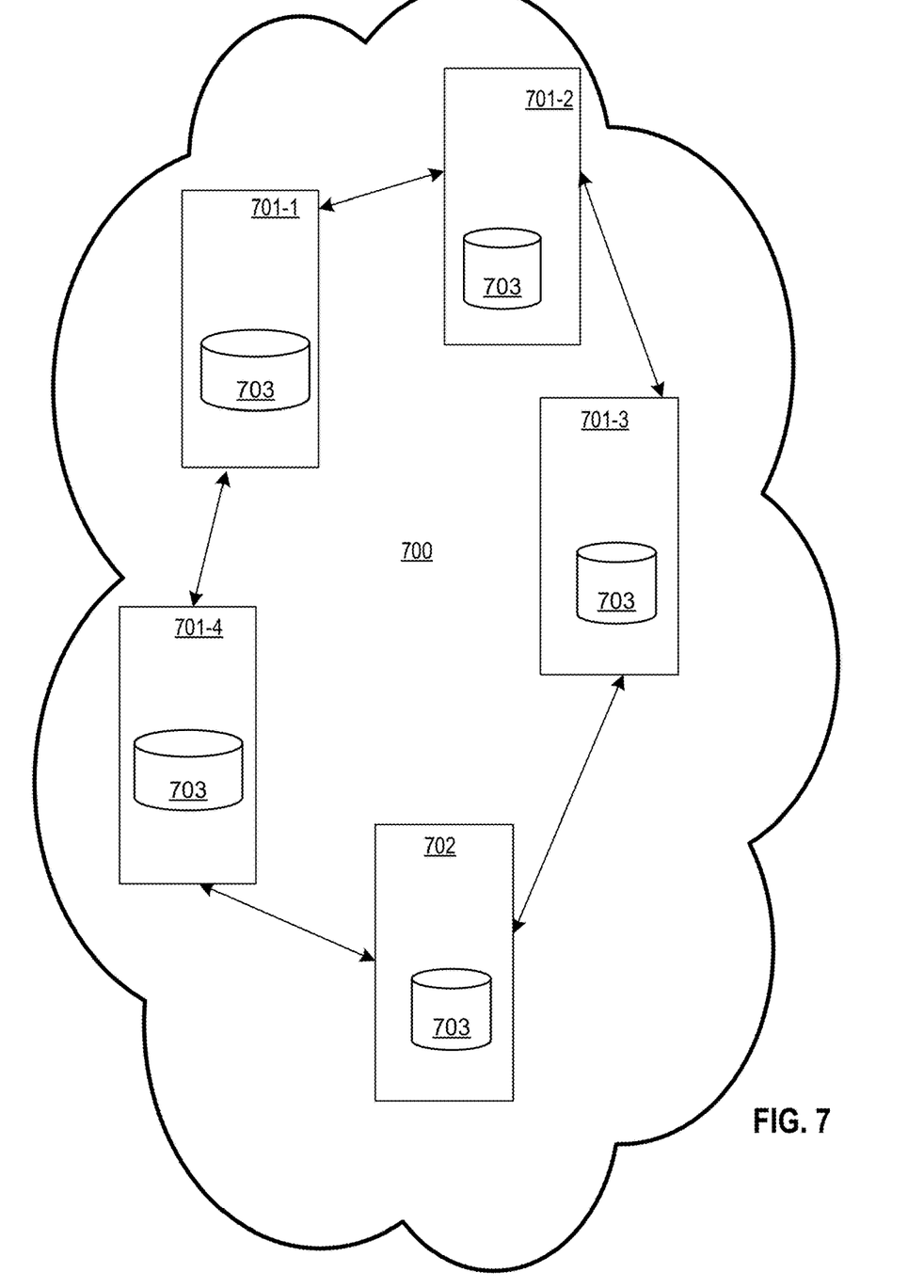
FIG. 7 illustrates a plurality of systems and a management apparatus, in accordance with an example implementation.

FIG. 7 illustrates a plurality of systems and a management apparatus configured to facilitate a platform, in accordance with an example implementation. One or more peer nodes 701-1, 701-2, 701-3, and 701-4 are considered to interact with each other over a network 700 that implements a platform facilitated by management apparatus 702 in the manner illustrated in the architecture of FIG. 6. The management apparatus 702 can be configured to have a copy of replicated state as database 703 as in each of the peer nodes 701-1, 701-2, 701-3, 701-4 and accessible through the peer network 700. Such a peer network 700 can be implemented as a wide area network (WAN) managed by one or more physical switches, or so on in accordance with the desired implementation.

Figure 8:
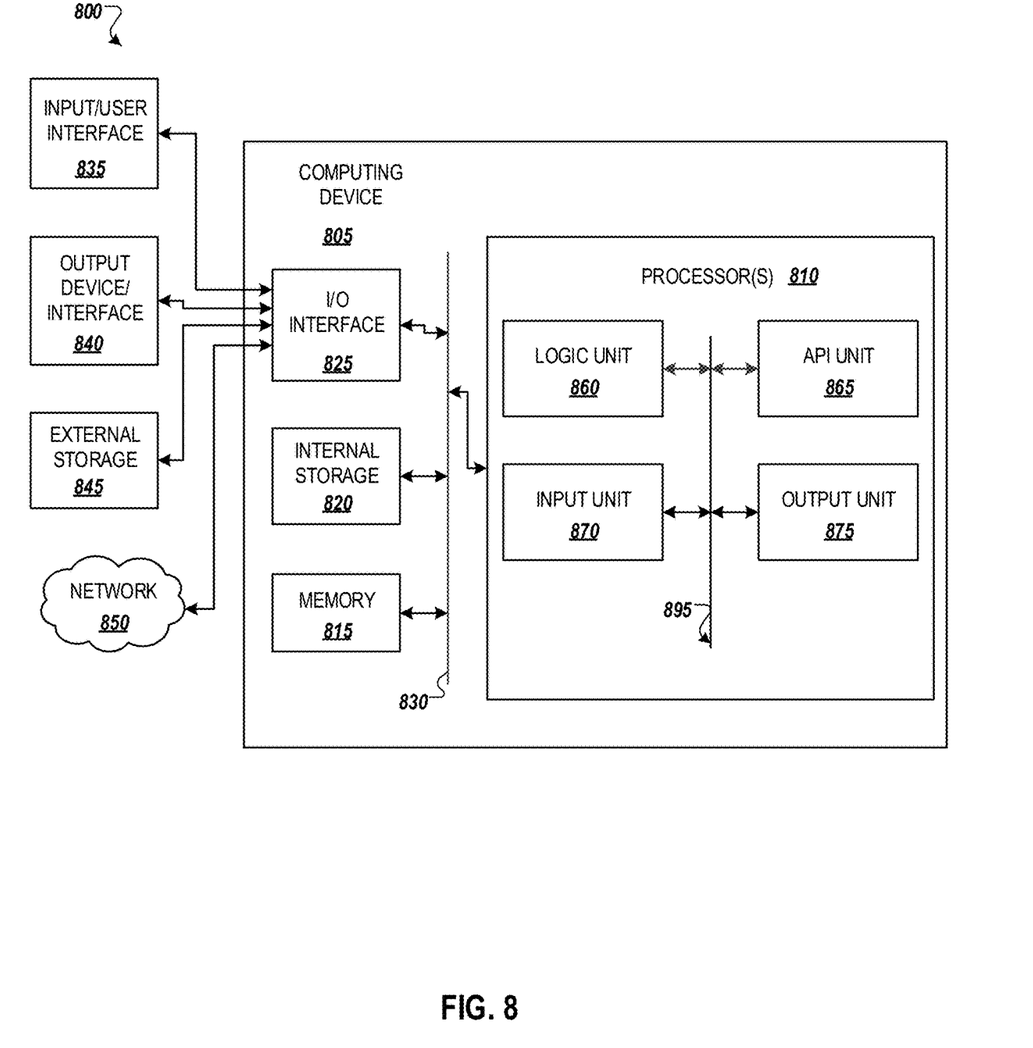
FIG. 8 illustrates an example computing environment with an example computer device suitable for use in some example implementations.

FIG. 8 illustrates an example computing environment with an example computer device suitable for use in some example implementations, such as a management apparatus 702 or as a peer node 701-1, 701-2, 701-3, 701-4 as illustrated in FIG. 6 and FIG. 7.

Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805. I/O interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to, through execution of the flow of FIG. 5, execute smart contracts across the plurality of peer nodes through the first dedicated channel based on verification of the transactions from the plurality of peer nodes associated with the transactions as illustrated at 620 of FIG. 6; and transmit an invoice flag to a client application of the two of the plurality of peer nodes associated with the transactions based on the verification of the transactions from the plurality of peer nodes associated with the transactions as illustrated at 610 of FIG. 6.

Processor(s) 810 can be configured to, through the execution of the flow of FIG. 5, execute the smart contracts across the plurality of peer nodes through the first dedicated channel based on the verification of the transactions from the plurality of peer nodes associated with the transactions by collecting tokens at a leader peer node selected from the plurality of peer nodes associated with the transactions from the plurality of peer nodes associated with the transactions, the token indicative of validity of the transactions, as illustrated in the flow of 500 to 503 of FIG. 5; and for the collected tokens indicative of having a probability of acceptance by the plurality of peer nodes associated with the transactions greater than a threshold, confirming the transactions at each of the plurality of peer nodes associated with the transactions and committing the transactions to the plurality of first replicated state databases as illustrated at 504 and 505 of FIG. 5.

Processor(s) 810 can be configured to, through the example implementations of FIG. 5, transmit the invoice flag to the client application of the two of the plurality of peer nodes based on the verification of the transactions from the plurality of peer nodes associated with the transaction by collecting tokens at a leader peer node selected from the plurality of peer nodes associated with the transactions from the plurality of peer nodes associated with the transactions, the token indicative of invoicing terms associated with the transactions; for the tokens indicative of having all invoice terms committed from the plurality of peer nodes associated with the transactions, conducting validation of the invoice terms across the plurality of peer nodes associated with the transactions; and for the validation of the invoicing terms across the plurality of peer nodes associated with the transactions being successful, committing the invoice terms in the plurality of second replicated state databases and transmitting a successful invoice flag to the client application of the two of the plurality of peer nodes as illustrated at 505 to 508 of FIG. 5.

In an example implementation computer device 805 can be in a part of a system as illustrated in FIG. 6 that provides a plurality of first replicated state databases that are configured to manage transactions; the plurality of first replicated state databases configured to be accessed by a plurality of peer nodes associated with the transactions over a first dedicated channel; and that provides a plurality of second replicated state databases that are configured to manage invoice terms; the plurality of second replicated state databases configured to be accessed by two of the plurality of peer nodes associated with invoicing of the transactions over a second dedicated channel.

In an example implementation, the client application of a customer node from the two of the plurality of peer nodes is configured to pay according to the invoice terms in response to the invoice flag indicative of a successful invoice flag. In this manner, invoices do not need to be created to the customer node, but rather an automatic payment can be dispatched in response to a flag.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system, comprising:
providing a plurality of first replicated state databases that are configured to manage transactions; the plurality of first replicated state databases configured to be accessed by a plurality of peer nodes associated with the transactions over a first dedicated channel;
providing a plurality of second replicated state databases that are configured to manage invoice terms; the plurality of second replicated state databases configured to be accessed by two of the plurality of peer nodes associated with invoicing of the transactions over a second dedicated channel;
executing smart contracts across the plurality of peer nodes through the first dedicated channel based on verification of the transactions from the plurality of peer nodes associated with the transactions, wherein the verification of the transactions within a time window is based on a probability of the verification of the transactions exceeding a threshold, wherein the threshold is based on a majority of the plurality of peer nodes executing and accepting the transaction within the time window;
transmitting an invoice flag to a client application of the two of the plurality of peer nodes associated with the transactions based on the verification of the transactions from the plurality of peer nodes associated with the transactions; and
performing automatic invoice generation based on the transmitted invoice flag,
wherein the executing the smart contracts across the plurality of peer nodes through the first dedicated channel removes manual reconciliations associated with invoicing.

2. The method of claim 1, wherein the plurality of peer nodes is formed into subgroups comprising customer subgroup, distributor subgroup, transient subgroup, and supplier subgroup; wherein the two of the plurality of peer nodes associated with the invoicing of the transactions are from the customer subgroup and the distributor subgroup.

3. The method of claim 1, wherein the executing the smart contracts across the plurality of peer nodes through the first dedicated channel based on the verification of the transactions from the plurality of peer nodes associated with the transactions comprises:

collecting tokens at a leader peer node selected from the plurality of peer nodes associated with the transactions from the plurality of peer nodes associated with the transactions, the token indicative of validity of the transactions;

for the collected tokens indicative of having a probability of acceptance by the plurality of peer nodes associated with the transactions greater than a threshold, confirming the transactions at each of the plurality of peer nodes associated with the transactions and committing the transactions to the plurality of first replicated state databases.

4. The method of claim 1, wherein the transmitting the invoice flag to the client application of the two of the plurality of peer nodes based on the verification of the transactions from the plurality of peer nodes associated with the transaction comprises:

collecting tokens at a leader peer node selected from the plurality of peer nodes associated with the transactions from the plurality of peer nodes associated with the transactions, the token indicative of invoicing terms associated with the transactions;

for the tokens indicative of having all invoice terms committed from the plurality of peer nodes associated with the transactions, conducting validation of the invoice terms across the plurality of peer nodes associated with the transactions; and for the validation of the invoicing terms across the plurality of peer nodes associated with the transactions being successful, committing the invoice terms in the plurality of second replicated state databases and transmitting a successful invoice flag to the client application of the two of the plurality of peer nodes.

5. The method of claim 1, wherein the client application of a customer node from the two of the plurality of peer nodes is configured to pay according to the invoice terms in response to the invoice flag indicative of a successful invoice flag.

6. A non-transitory computer readable medium, storing instructions for executing a process on a system, the instructions comprising:

providing a plurality of first replicated state databases that are configured to manage transactions; the plurality of first replicated state databases configured to be accessed by a plurality of peer nodes associated with the transactions over a first dedicated channel;

providing a plurality of second replicated state databases that are configured to manage invoice terms; the plurality of second replicated state databases configured to be accessed by two of the plurality of peer nodes associated with invoicing of the transactions over a second dedicated channel;

executing smart contracts across the plurality of peer nodes through the first dedicated channel based on verification of the transactions from the plurality of peer nodes associated with the transactions, wherein the verification of the transactions within a time window is based on a probability of the verification of the transactions exceeding a threshold, wherein the threshold is based on a majority of the plurality of peer nodes executing and accepting the transaction within the time window;

transmitting an invoice flag to a client application of the two of the plurality of peer nodes associated with the transactions based on the verification of the transactions from the plurality of peer nodes associated with the transactions; and performing automatic invoice generation based on the transmitted invoice flag, wherein the executing the smart contracts across the plurality of peer nodes through the first dedicated channel removes manual reconciliations associated with invoicing.

7. The non-transitory computer readable medium of claim 6, wherein the plurality of peer nodes is formed into subgroups comprising customer subgroup, distributor subgroup, transient subgroup, and supplier subgroup; wherein the two of the plurality of peer nodes associated with the invoicing of the transactions are from the customer subgroup and the distributor subgroup.

8. The non-transitory computer readable medium of claim 6, wherein the executing the smart contracts across the plurality of peer nodes through the first dedicated channel based on the verification of the transactions from the plurality of peer nodes associated with the transactions comprises:

collecting tokens at a leader peer node selected from the plurality of peer nodes associated with the transactions from the plurality of peer nodes associated with the transactions, the token indicative of validity of the transactions;

for the collected tokens indicative of having a probability of acceptance by the plurality of peer nodes associated with the transactions greater than a threshold, confirming the transactions at each of the plurality of peer nodes associated with the transactions and committing the transactions to the plurality of first replicated state databases.

9. The non-transitory computer readable medium of claim 6, wherein the transmitting the invoice flag to the client application of the two of the plurality of peer nodes based on the verification of the transactions from the plurality of peer nodes associated with the transaction comprises:

collecting tokens at a leader peer node selected from the plurality of peer nodes associated with the transactions from the plurality of peer nodes associated with the transactions, the token indicative of invoicing terms associated with the transactions;

for the tokens indicative of having all invoice terms committed from the plurality of peer nodes associated with the transactions, conducting validation of the invoice terms across the plurality of peer nodes associated with the transactions; and for the validation of the invoicing terms across the plurality of peer nodes associated with the transactions being successful, committing the invoice terms in the plurality of second replicated state databases and transmitting a successful invoice flag to the client application of the two of the plurality of peer nodes.

10. The non-transitory computer readable medium of claim 6, wherein the client application of a customer node from the two of the plurality of peer nodes is configured to pay according to the invoice terms in response to the invoice flag indicative of a successful invoice flag.

11. A system, comprising:

a plurality of first replicated state databases that are configured to manage transactions; the plurality of first replicated state databases configured to be accessed by a plurality of peer nodes associated with the transactions over a first dedicated channel;

a plurality of second replicated state databases that are configured to manage invoice terms; the plurality of second replicated state databases configured to be accessed by two of the plurality of peer nodes associated with invoicing of the transactions over a second dedicated channel; and a processor, configured to:

execute smart contracts across the plurality of peer nodes through the first dedicated channel based on verification of the transactions from the plurality of peer nodes associated with the transactions, wherein the verification of the transactions within a time window is based on a probability of the verification of the transactions exceeding a threshold, wherein the threshold is based on a majority of the plurality of peer nodes executing and accepting the transaction within the time window;

transmit an invoice flag to a client application of the two of the plurality of peer nodes associated with the transactions based on the verification of the transactions from the plurality of peer nodes associated with the transactions; and performing automatic invoice generation based on the transmitted invoice flag, wherein the executing the smart contracts across the plurality of peer nodes through the first dedicated channel removes manual reconciliations associated with invoicing.

12. The system of claim 11, wherein the plurality of peer nodes is formed into subgroups comprising customer subgroup, distributor subgroup, transient subgroup, and supplier subgroup; wherein the two of the plurality of peer nodes associated with the invoicing of the transactions are from the customer subgroup and the distributor subgroup.

13. The system of claim 11, wherein the processor is configured to execute the smart contracts across the plurality of peer nodes through the first dedicated channel based on the verification of the transactions from the plurality of peer nodes associated with the transactions by:

collecting tokens at a leader peer node selected from the plurality of peer nodes associated with the transactions from the plurality of peer nodes associated with the transactions, the token indicative of validity of the transactions;

for the collected tokens indicative of having a probability of acceptance by the plurality of peer nodes associated with the transactions greater than a threshold, confirming the transactions at each of the plurality of peer nodes associated with the transactions and committing the transactions to the plurality of first replicated state databases.

14. The system of claim 11, wherein the processor is configured to transmit the invoice flag to the client application of the two of the plurality of peer nodes based on the verification of the transactions from the plurality of peer nodes associated with the transaction by:

collecting tokens at a leader peer node selected from the plurality of peer nodes associated with the transactions from the plurality of peer nodes associated with the transactions, the token indicative of invoicing terms associated with the transactions;

for the tokens indicative of having all invoice terms committed from the plurality of peer nodes associated with the transactions, conducting validation of the invoice terms across the plurality of peer nodes associated with the transactions; and     for the validation of the invoicing terms across the plurality of peer nodes associated with the transactions being successful, committing the invoice terms in the plurality of second replicated state databases and transmitting a successful invoice flag to the client application of the two of the plurality of peer nodes.

15. The system of claim 11, wherein the client application of a customer node from the two of the plurality of peer nodes is configured to pay according to the invoice terms in response to the invoice flag indicative of a successful invoice flag.

* * * * *